(12) United States Patent  
Kereth

(10) Patent No.: US 9,616,994 B2
(45) Date of Patent: Apr. 11, 2017

(54) ASYMMETRIC MULTIROTOR HELICOPTER

(71) Applicant: Yefim Kereth, Rehovot (IL)

(72) Inventor: Yefim Kereth, Rehovot (IL)

( * ) Notice: Subject to any disclaimer, the term of this patent is extended or adjusted under 35 U.S.C. 154(b) by 9 days.

(21) Appl. No.: 14/668,857

(22) Filed: Mar. 25, 2015

(65) Prior Publication Data

US 2015/0274286 A1 Oct. 1, 2015

(51) Int. Cl.
*B64C 27/00* (2006.01)
*B64C 27/10* (2006.01)
*B64C 27/12* (2006.01)
*B64C 27/08* (2006.01)
*B64C 39/02* (2006.01)

(52) U.S. Cl.
CPC .............. *B64C 27/10* (2013.01); *B64C 27/08* (2013.01); *B64C 27/12* (2013.01); *B64C 39/024* (2013.01); *B64C 2201/027* (2013.01); *B64C 2201/108* (2013.01)

(58) Field of Classification Search
None
See application file for complete search history.

(56) References Cited

U.S. PATENT DOCUMENTS

| | | | | |
|---|---|---|---|---|
| 3,669,564 A | * | 6/1972 | Garfinkle | B64C 27/12 244/17.19 |
| 4,963,108 A | * | 10/1990 | Koda | B63H 5/10 244/60 |
| 5,064,143 A | * | 11/1991 | Bucher | B64C 27/10 244/12.2 |
| 6,293,492 B1 | * | 9/2001 | Yanagisawa | B64C 27/52 244/17.23 |
| 6,719,244 B1 | * | 4/2004 | Gress | B64C 29/0033 244/17.25 |
| 7,699,260 B2 | * | 4/2010 | Hughey | B64C 31/028 244/17.11 |
| 8,322,647 B2 | * | 12/2012 | Amraly | B64C 11/001 244/12.4 |
| 8,464,511 B1 | * | 6/2013 | Ribarov | B64C 11/48 60/226.1 |
| 8,473,125 B2 | * | 6/2013 | Rischmuller | A63H 27/12 244/17.13 |

(Continued)

*Primary Examiner* — Medhat Badawi
(74) *Attorney, Agent, or Firm* — Stetina Brunda Garred Brucker

(57) ABSTRACT

An asymmetric multirotor helicopter has a structure supporting at least one main and two secondary propulsion systems. A flight control unit controls the helicopter by varying the relative speed of each of the main and secondary propulsion systems. Each main propulsion system includes at least one main motor drive and a main drive shaft that carries and propels a main differential contra-rotating transmission configured to share the power provided by the main drive shaft with two contra-rotating output shafts. Each secondary propulsion system includes at least one secondary motor drive and a secondary drive shaft that carries and propels respective secondary propulsion blades. The two contra-rotating output shafts support and propel for mutually contra-rotation motion two sets of main propulsion blades. The main drive shaft rotates in the same direction as one of the secondary drive shafts and at least one secondary drive shaft rotates in an opposite direction.

20 Claims, 4 Drawing Sheets

(56) References Cited

U.S. PATENT DOCUMENTS

| | | | | |
|---|---|---|---|---|
| 2005/0061910 A1* | 3/2005 | Wobben | ................... | B64C 27/20 244/17.23 |
| 2006/0226281 A1* | 10/2006 | Walton | ................ | B64C 29/0033 244/17.23 |
| 2008/0006737 A1* | 1/2008 | Wobben | ................... | B64C 27/20 244/17.13 |
| 2008/0048065 A1* | 2/2008 | Kuntz | .................... | A63H 17/00 244/17.23 |
| 2010/0301168 A1* | 12/2010 | Raposo | ................. | A63H 23/00 244/171.2 |
| 2011/0284684 A1* | 11/2011 | Amraly | ................. | B64C 11/001 244/12.4 |
| 2012/0083945 A1* | 4/2012 | Oakley | ................... | B64C 27/08 701/2 |
| 2014/0175214 A1* | 6/2014 | Lundgren | .............. | B64D 47/08 244/17.23 |
| 2014/0339355 A1* | 11/2014 | Olm | ........................ | B64C 27/08 244/17.23 |
| 2016/0046369 A1* | 2/2016 | Watkins | ................... | B64C 5/02 244/7 A |

\* cited by examiner

ASYMMETRIC MULTIROTOR HELICOPTER

CROSS-REFERENCE TO RELATED APPLICATIONS

The present application claims priority to Israeli Application No 231811 filed on Mar. 16, 2014.

STATEMENT RE: FEDERALLY SPONSORED RESEARCH/DEVELOPMENT

Not Applicable

BACKGROUND

Field of the Invention

This invention relates to a helicopter with a multirotor structure and flight control.

Background of the Invention

The following definition for a multirotor aerial vehicle is:

"A multirotor or multicopter is a rotorcraft with more than two rotors. Multirotors often use fixed-pitch blades, whose rotor pitch does not vary as the blades rotate; control of vehicle motion is achieved by varying the relative speed of each rotor to change the thrust and torque produced by each. Due to their ease of both construction and control, multirotor aircraft are frequently used in model and radio control aircraft projects in which the names quadcopter, hexacopter and octocopter are frequently used to refer to 4-, 6- and 8-rotor helicopters, respectively. Radio controlled multirotors are increasingly used as a low-budget option to create aerial photography and videos of sites and buildings.

Flight control in electronically controlled multicopters is achieved using a minimum of four control channels. One channel is usually labeled throttle and increases or decreases power to all motors evenly. This causes the aircraft to ascend or descend. The other three channels, labeled aileron, elevator, and rudder, control the roll, pitch, and yaw axes respectively. These three control inputs work by causing a change in aircraft attitude (tilt or direction). For example in an X4 configuration, forward tilt or pitch is controlled by increasing the speed of the two rear motors while decreasing the speed of the two front motors. Left or right tilt or roll is controlled by differences in the speed of the two right motors vs. the two left motors. The flight direction or yaw is controlled by changing the relative speeds of adjacent, counter rotating motors." (Wikipedia)

A typical multirotor propulsion system may be of direct-drive configuration i.e. without reduction gear, this being the most common configuration, or of non-direct-drive configuration i.e. with reduction gear, this being a less common configuration. As long as a low lift capacity is required, as it is in model and radio controlled aircraft projects, the multirotor configuration has advantages relating to simplicity of structure and flight control and in reduced production costs, relative to the typical single main rotor helicopter configurations (e.g. Bell 206), or to tandem main rotor configurations (e.g. Chinook). However, at high lift capacity, the complexity of the multirotor vehicle, because of the higher number of high power propulsion systems and because of the significantly larger span and weight of the vehicle's structure required to support the propulsion systems, is considered a disadvantage relative to typical helicopter configurations.

It would obviously be advantageous to combine the advantages of a multirotor configuration relating to simplified structure and flight control with those of a typical helicopter having fewer main propulsion systems.

BRIEF SUMMARY

It is therefore a broad object of the present invention to provide a helicopter with a multirotor structure and flight control.

Specifically, it is an object of the invention to provide a helicopter having one or, at most, two main rotors, and a flight control based on the structure and principles of multirotor flight control.

The object is realized in accordance with a broad aspect of the invention by an asymmetric helicopter with a multirotor structure and flight control having the features of the main claim.

In one embodiment, the asymmetric helicopter comprises:
 a structure supporting at least one main propulsion system and at least two secondary propulsion systems;
 a flight control unit configured to control the helicopter by varying the relative speed of each of the main and secondary propulsion systems to change the respective thrust and the torque produced thereby;
 each of said main propulsion systems including at least one main motor drive and a main drive shaft that carries and propels a main differential contra-rotating transmission;
 each of said secondary propulsion systems including at least one secondary motor drive and a secondary drive shaft that carries and propels respective secondary propulsion blades;
 said main differential contra-rotating transmission being configured to share the power provided by the main drive shaft with two contra-rotating output shafts so as to transfer an increased output torque to the two contra-rotating output shafts without inducing a high reactive torque on said structure;
 said two contra-rotating output shafts supporting and propelling for mutually contra-rotation motion two sets of main propulsion blades;
 at least one of the main drive shafts being configured to rotate in the same direction as one or more of the main or secondary drive shafts;
 at least one of the secondary drive shafts being configured to rotate in an opposite direction to the direction of at least one of the main or secondary drive shaft;
 said main propulsion blades being adapted to provide significantly higher thrust than the secondary propulsion blades; and
 said main drive shaft generating a torque that varies in a range matching that of the secondary drive shaft.

The flight control unit controls the helicopter based on known principles of the multirotor flight control. Thus, the flight control unit has a throttle, aileron, elevator, and rudder configured to operate as follows:
 ascend or descend is controlled by increasing or decreasing the power to the all the propulsion systems;
 forward tilt is controlled by the elevator by increasing the speed of the rear propulsion system while decreasing the speed of the front propulsion system;
 rear tilt is controlled by the elevator by increasing the speed of the front propulsion system while decreasing the speed of the rear propulsion systems;
 left tilt is controlled by the aileron by increasing the speed of the right propulsion system while decreasing the speed of the left propulsion system;

right tilt is controlled by the aileron by increasing the speed of the left propulsion system while decreasing the speed of the right propulsion system;

left direction is controlled by the rudder by increasing the speed of the clockwise rotating motor drives while decreasing the speed of the counterclockwise rotating motor drives; and right direction is controlled by the rudder by increasing the speed of the counter-clockwise rotating motor drives while decreasing the speed of the clockwise rotating motor drives.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

Figure 1:
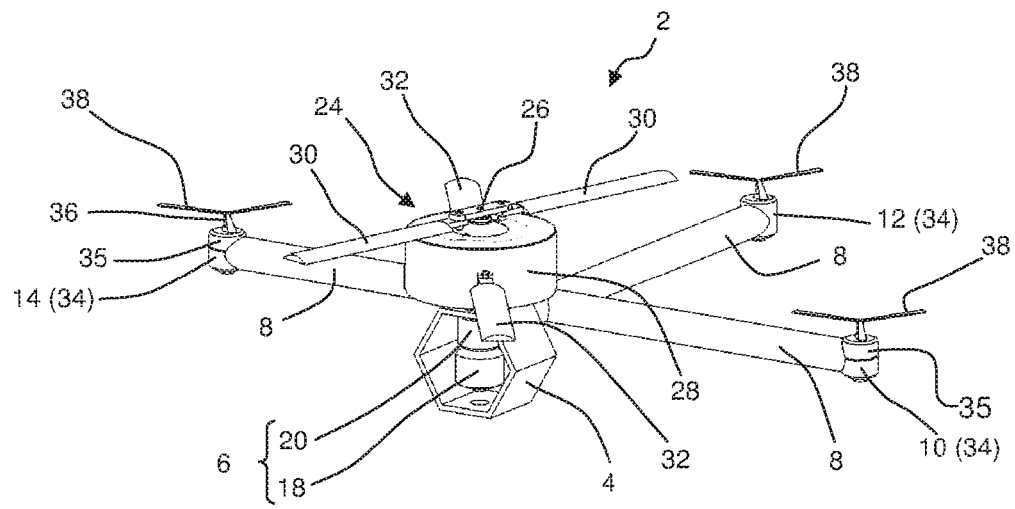
FIGS. 1 to 4 are a general perspective, side, front and top views of a single main rotor helicopter with a multirotor structure and flight control of "+" configuration.
Figure 2:
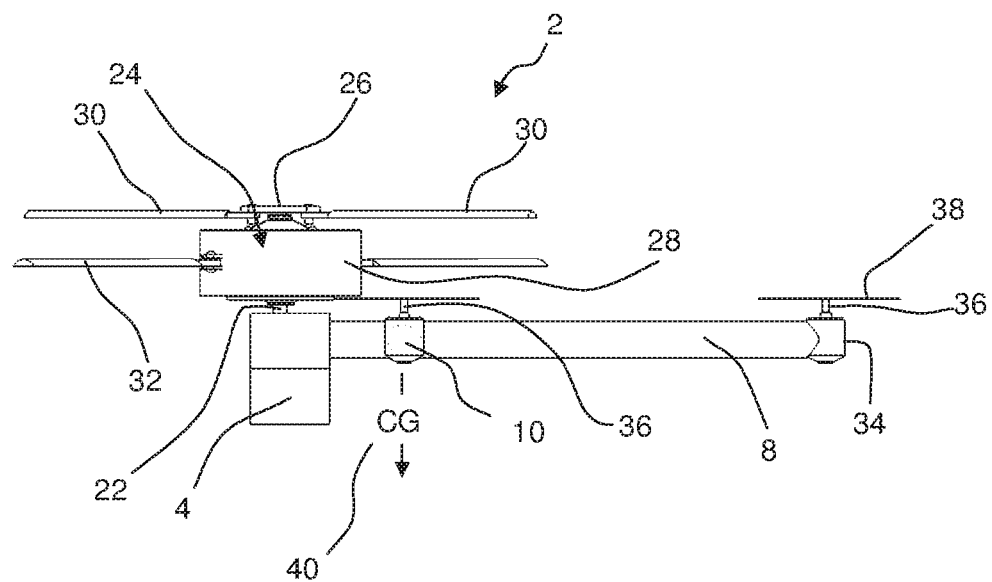
Figure 3:
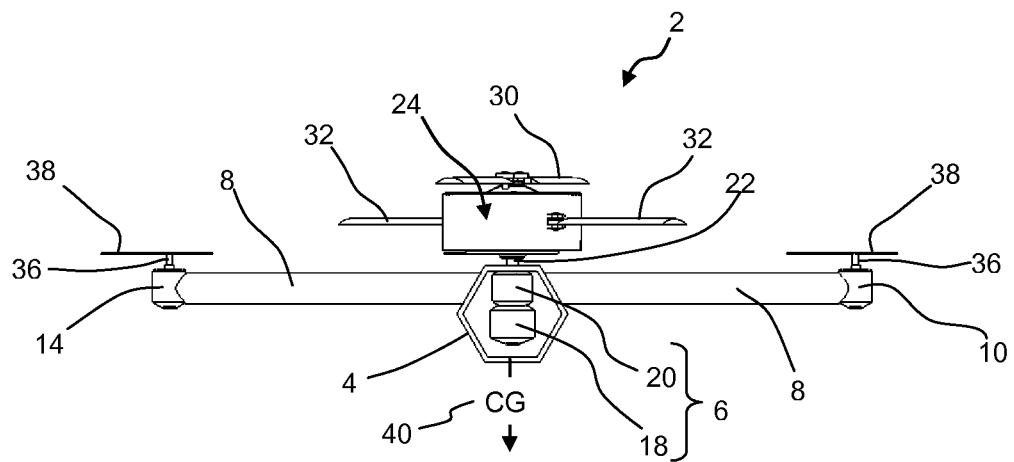
Figure 4:
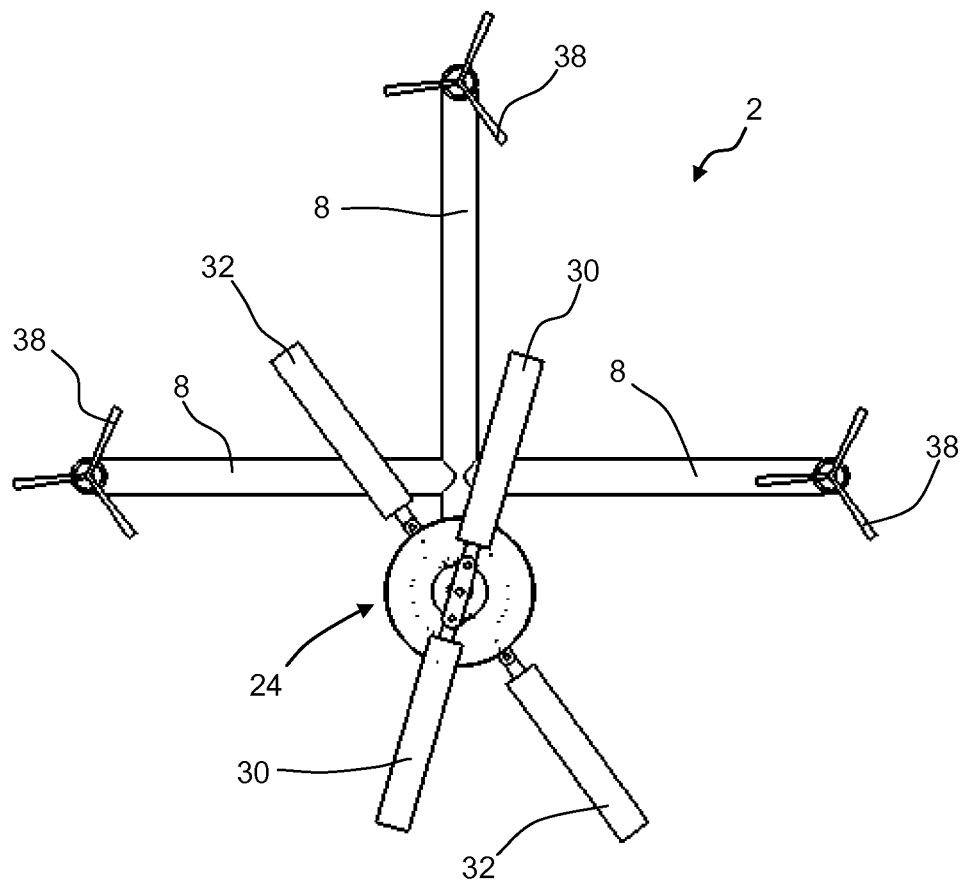

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

FIGS. 1 to 4 are general representations of a single main rotor helicopter with a multirotor structure and flight control of "+" configuration shown generally as 2 comprising a main structure 4 that carries a main propulsion system 6 and having three secondary arms 8, each adapted to carry one of three secondary propulsion systems 10, 12 and 14. The main propulsion system 6 is a high-power system and it is significantly more powerful than the three secondary propulsion systems 10, 12 and 14. The high power main propulsion system 6 includes at least one high-speed main motor drive 18 that optionally may be coupled to a reduction transmission 20. The main propulsion system 6 has a main drive shaft 22 that carries and propels a main differential contra-rotating transmission 24. The differential contra-rotating transmission 24 has a first output shaft 26 rotatable in the same direction as the main drive shaft 22, and a second output shaft 28 rotatable in the opposite direction to the main drive shaft 22, each connectable to the main propulsion blades 30 and 32, respectively.

The high speed of the main motor drive 18 is converted by the differential contra-rotating transmission 24 into a high torque at the output shafts 26 and 28, with only moderate reactive torque on the main structure 4. The differential contra-rotating transmission 24 can be implemented based on the prior art publications (e.g. U.S. Pat. No. 4,963,108), or based on the commonly implemented planetary gear transmissions, or based on IL 231617 filed 20 Mar. 2014 also published as WO 2015/140805 on Sep. 24, 2015. The fact that the main motor drive 18 is a high-speed motor, allows the main propulsion system 6 to provide high power via the main drive shaft 22, while the main drive shaft 22 transfers a moderate propulsion torque. The propulsion torque transferred via the main drive shaft 22 can be moderate because of the implementation of the differential contra-rotating transmission 24, which allows the torque at the output shafts 26 and 28 to be significantly increased, while significantly reducing the rotation speed of these shafts. The secondary propulsion systems 10, 12 and 14 are low-power systems and include at least one low-power secondary motor drive 34 that optionally may be coupled to a secondary reduction transmission, shown schematically as 35 in FIG. 1. The secondary propulsion systems 10, 12 and 14 each have a secondary drive shaft 36 that carries and propels the secondary propulsion blades 38. The secondary propulsion systems 10, 12 and 14 provide low power via the secondary drive shaft 36, which is rotatable at low speed but transfers a moderate propulsion torque of the same magnitude as the torque transferred by the main drive shaft 22.

In FIGS. 1 to 4, the main motor drive 18 (and its respective differential contra-rotating transmission 24 and blades 30, 32) and the secondary motor drive 34 of the secondary propulsion system 12 (and its respective blades 38), constitute front and rear propulsion systems whose respective motor drives rotate in the same direction, while the secondary motor drives 34 of the secondary propulsion systems 10 and 14 (and their respective blades 38) rotate in the opposite direction to the motor drive 18.

Figure 5:
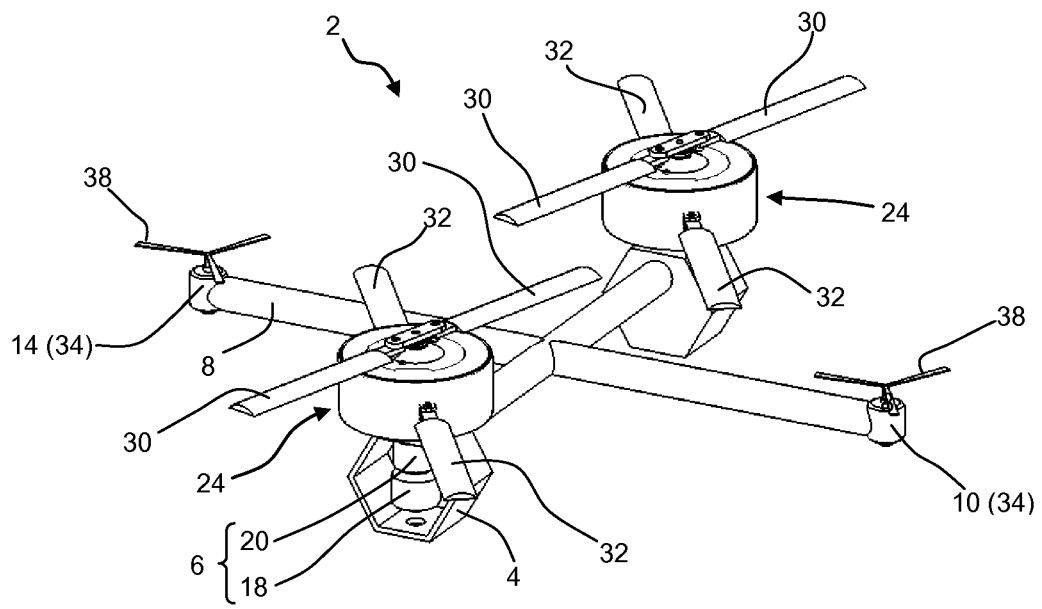
FIGS. 5 to 7 are general perspective, side and top views of a two main rotors helicopter with a multirotor structure and flight control of "+" configuration.
Figure 6:
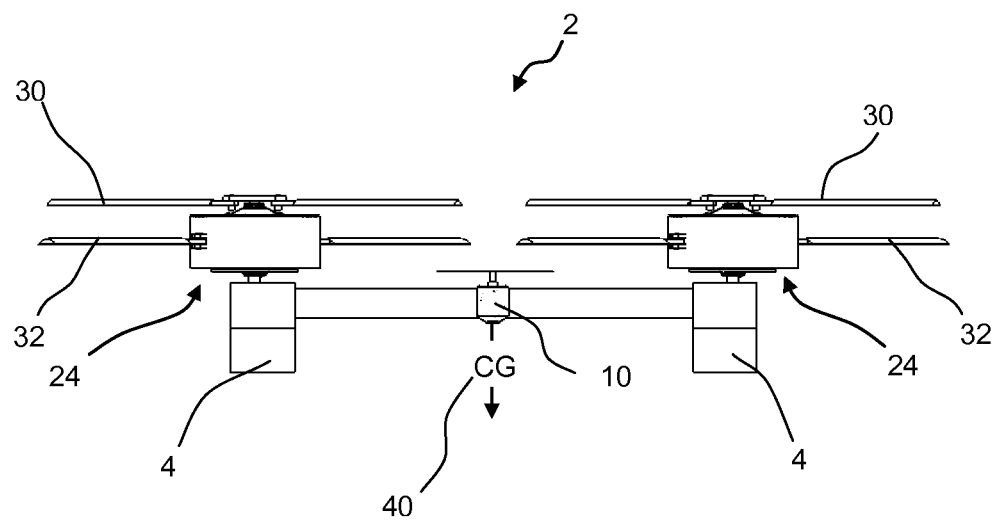
Figure 7:
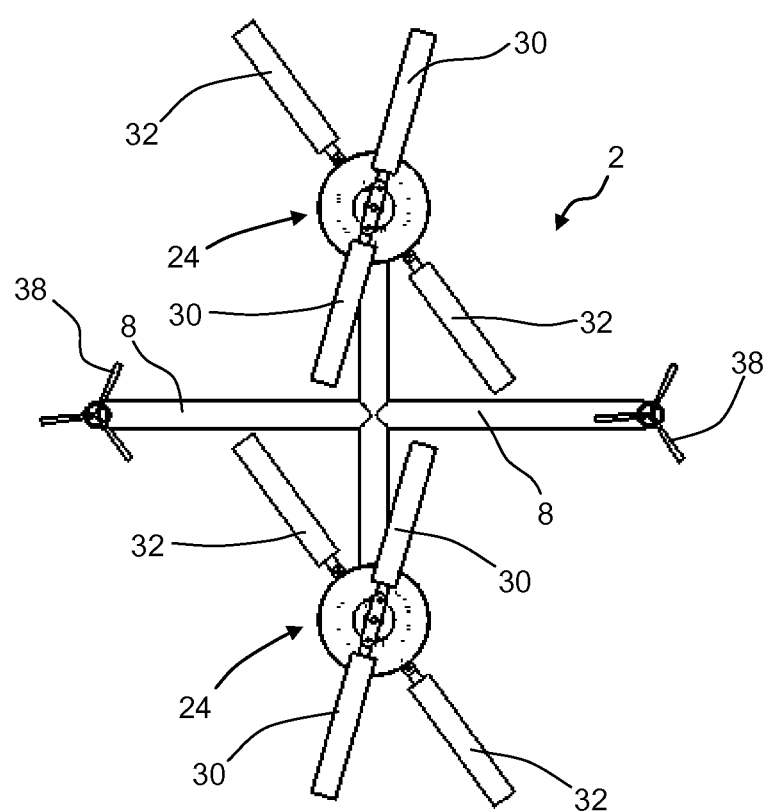

In FIGS. 5 to 7, there is shown a helicopter having a main structure 4 that carries two main propulsion systems 6 connected in tandem (one at the front and one at the rear) and two secondary arms 8, each adapted to carry respective secondary propulsion systems 10 and 14. The main front motor drive 18 (and its respective blades 30) and the main rear motor drive 18 (and its respective blades 30), rotate in the same direction, while the secondary motor drives 34 of the secondary propulsion systems 10 and 14 (and their respective blades 38) rotate in the opposite direction to the motor drive 18.

The design of the helicopter 2 ensures that the center of gravity 40 is aligned with the direction of the resultant thrust force of the main and secondary propulsion blades 30, 32 and 38. The center of gravity 40 (FIGS. 1 to 4) will be close to the main propulsion system 6, since the main propulsion system 6 provides a significant portion of the thrust, and therefore the center of gravity will be close to the main structure 4. This fact makes it possible to reduce the weight of the main structure 4 and of the secondary arms 8 and thus to reduce the overall weight of the helicopter 2.

The flight control unit (not shown) electronically controls the helicopter 2 using a minimum of four control channels: first channel controls the throttle (not shown), other three channels control the aileron (not shown), elevator (not shown), and rudder (not shown), which control the roll, pitch, and yaw axes, respectively.

The above-mentioned combined configuration, featured by one, or, at most, two main rotors driven by a main propulsion system 6, and featured by a flight control unit which is based on the principles of multirotor flight control, can be achieved due to the torque similarity at the main drive shaft 22 and at the secondary drive shafts 36. This similarity is a result of the implementation of a differential contra-rotating transmission 24. It will be appreciated that the flight control unit is not a feature of the invention per se and is therefore not described. Typically, the flight control unit is a standard unit in a multirotor helicopter to which the throttle, the aileron, the elevator, and the rudder are responsively coupled in known manner.

For the sake of completeness, it is noted that the four control channels control the helicopter 2 of "+" configuration (FIGS. 1 to 7) based on the following principles:

the ascend or descend is controlled by the throttle by increasing or decreasing the power to the all the propulsion systems;

the forward tilt is controlled by the elevator by increasing the speed of the rear propulsion system while decreasing the speed of the front propulsion system;

the rear tilt is controlled by the elevator by increasing the speed of the front propulsion system while decreasing the speed of the rear propulsion systems;

the left tilt is controlled by the aileron by increasing the speed of the right propulsion system while decreasing the speed of the left propulsion system;

the right tilt is controlled by the aileron by increasing the speed of the left propulsion system while decreasing the speed of the right propulsion system;

the left direction is controlled by the rudder by increasing the speed of the clockwise rotating motor drives while decreasing the speed of the counter-clockwise rotating motor drives;

the right direction is controlled by the rudder by increasing the speed of the counter-clockwise rotating motor drives while decreasing the speed of the clockwise rotating motor drives.

We will now consider the behavior of the helicopter 2 under the above-mentioned control. As stated above, control of multirotor motion is achieved by varying the relative speed of each rotor to change the thrust and torque produced by each. The main propulsion system 6 of the helicopter 2 is significantly more powerful than the secondary propulsion systems 10, 12 and 14. Assuming a linear response of the main and the secondary propulsion systems 6, 10, 12 and 14, respectively, if the center of gravity 40 is aligned with the direction of the resultant thrust force, then motion of the helicopter 2 during ascend or descend control will not create any derived motions in the roll, pitch, and yaw axes.

Whenever high cruising speed is required, the thrust vector of the helicopter 2 can be adjusted for the partial horizontal thrust, just by the tilt of the rear secondary propulsion system 12, or by the tilt of the right and left secondary propulsion systems 10 and 14.

It should be stated, that the front and the rear of the helicopter 2, as described in the detail description and in the drawings, can be interchanged such that in the forward flight the main propulsion system 6 is at the rear of the helicopter 2 and the secondary propulsion system 12 is at the front. Therefore, within the context of the appended claims the terms "front" and "rear" and "right" and "left" are not to be construed in a limiting manner but are relative to the direction of motion of the helicopter.

Although, for the sake of explanation, the principles of the helicopter according to the invention have been described and shown in the figures with regard to the "+" configuration, the same principles are equally applicable to other configurations as well such as 6 rotors, 8 rotors, etc.

It should also be noted that the secondary motor drives 34 may be of a different rated power and the secondary propulsion blades 38 may be of different diameter/shape. For example, the rear secondary propulsion system 12 may have a secondary motor drive 34 with a power rating that is higher or lower than that of the motor drives 34 of the secondary propulsion systems 10 and 14. Accordingly, the secondary propulsion blades 38 connected to the secondary drive shaft 36 of the secondary propulsion system 12, may be of larger or smaller diameter and/or of a different shape than the secondary propulsion blades 38 of the secondary propulsion systems 10 and 14.

It will likewise be appreciated that although the invention has been described with specific reference to an aerial vehicle, this is by way of non-limiting example only and the multirotor structure and flight control according to the invention may be used in other media (e.g. as marine vehicle), configurations or applications. Likewise, while no fixed wing has been shown in the embodiments described, in other configurations the helicopter may have a structure that incorporates a fixed-wing.

What is claimed is:

1. An asymmetric multirotor helicopter, comprising:
   a structure supporting a main propulsion system, two lateral secondary propulsion systems and a rear propulsion system each having a respective drive shaft;
   a flight control unit that controls the helicopter by varying the relative speed of each of the main, lateral and rear propulsion systems to change the respective thrust and the torque produced by the main, lateral and rear propulsion systems;
   said main propulsion system including at least one main motor drive and a main drive shaft that carries and propels a main differential contra-rotating transmission;
   each of said secondary propulsion systems including at least one secondary motor drive and a secondary drive shaft that carries and propels respective secondary propulsion blades;
   said main differential contra-rotating transmission sharing the power provided by the main drive shaft with two contra-rotating output shafts so as to transfer an increased output torque to the two contra-rotating output shafts without inducing a high reactive torque on said structure;
   said two contra-rotating output shafts supporting and propelling for mutually contra-rotation motion two sets of main propulsion blades;
   the main drive shaft rotating in the same direction as the drive shaft of the rear propulsion system;
   the respective drive shafts of the two lateral secondary propulsion systems rotating in an opposite direction to the main drive shaft;
   said main propulsion blades providing significantly higher thrust than the secondary propulsion blades;
   said main drive shaft transferring a torque that varies in a range matching that of the secondary drive shafts;
   the main propulsion system and the rear propulsion system define a longitudinal axis of the helicopter and the two secondary propulsion systems define a lateral axis of the helicopter,
   a center of gravity of the helicopter is located in a region around the point of intersection of said lateral axis and said longitudinal axis; and
   the center of gravity is closer to the main propulsion system than to the rear propulsion system, whereby the multirotor helicopter has an asymmetric geometry.

2. The helicopter according to claim 1, wherein the main propulsion system includes a main transmission coupled to the main motor drive.

3. The helicopter according to claim 1, wherein at least one of the secondary propulsion systems includes a secondary reduction transmission coupled to the secondary motor drive.

4. The helicopter according to claim 1, wherein the motor drive of the rear propulsion system has a different power rating to the respective secondary motor drives of the two lateral secondary propulsion systems.

5. The helicopter according to claim 1, wherein the propulsion blades connected to the drive shaft of the rear propulsion system have a different diameter to the respective secondary propulsion blades of the two lateral secondary propulsion systems.

6. The helicopter according to claim 1, wherein the flight control unit generates respective throttle, aileron, elevator and rudder signals for controlling the helicopter based on principles of multirotor flight control.

7. The helicopter according to claim 6, wherein:
ascend and descend is controlled by respectively increasing and decreasing the power to the all the propulsion systems;
forward tilt is controlled by the elevator signal by increasing the speed of the rear propulsion system while decreasing the speed of the front propulsion system;
rear tilt is controlled by the elevator signal by increasing the speed of the front propulsion system while decreasing the speed of the rear propulsion systems;
left tilt is controlled by the aileron signal by increasing the speed of the right propulsion system while decreasing the speed of the left propulsion system;
right tilt is controlled by the aileron signal by increasing the speed of the left propulsion system while decreasing the speed of the right propulsion system;
left direction is controlled by the rudder signal by increasing the speed of the clockwise rotating motor drives while decreasing the speed of the counterclockwise rotating motor drives; and
right direction is controlled by the rudder signal by increasing the speed of the counter-clockwise rotating motor drives while decreasing the speed of the clockwise rotating motor drives.

8. The helicopter according to claim 1, wherein the rear propulsion system is a secondary propulsion system that includes at least one secondary motor drive and a secondary drive shaft that carries and propels respective secondary propulsion blades.

9. The helicopter according to claim 1, wherein said main motor drive is concentric with said main drive shaft.

10. The helicopter according to claim 1, wherein the main propulsion system differs from the secondary and rear propulsion systems in power and thrust values and causes an asymmetric thrust distribution around a center of gravity of the helicopter.

11. The helicopter according to claim 1, being fully controllable by four control channels varying the speed of the main propulsion system, the two secondary propulsion systems and the rear propulsion system, respectively.

12. An asymmetric multirotor helicopter, comprising:
a structure supporting a main propulsion system, a rear propulsion system and two secondary propulsion systems, the main and the rear propulsion systems defining a longitudinal axis of the helicopter and the two secondary propulsion systems defining a lateral axis of said helicopter, wherein:
a center of gravity of said helicopter is located in a region around the point of intersection of said lateral axis and said longitudinal axis;
the main propulsion system differs from the secondary and rear propulsion systems in power and thrust values causing an asymmetric thrust distribution around the center of gravity; and
the center of gravity is closer to the main propulsion system than to the rear propulsion system, whereby the multirotor helicopter has an asymmetric geometry.

13. The helicopter according to claim 12, being fully controllable by four control channels varying the speed of the main propulsion system, the two secondary propulsion systems and the rear propulsion system, respectively.

14. The helicopter according to claim 13, wherein:
ascend and descend are controlled by respectively increasing and decreasing the power to the all the propulsion systems;
forward tilt is controlled by the elevator signal by increasing the speed of the rear propulsion system while decreasing the speed of the front propulsion system;
rear tilt is controlled by the elevator signal by increasing the speed of the front propulsion system while decreasing the speed of the rear propulsion systems;
left tilt is controlled by the aileron signal by increasing the speed of the right propulsion system while decreasing the speed of the left propulsion system;
right tilt is controlled by the aileron signal by increasing the speed of the left propulsion system while decreasing the speed of the right propulsion system;
left direction is controlled by the rudder signal by increasing the speed of the clockwise rotating motor drives while decreasing the speed of the counterclockwise rotating motor drives; and
right direction is controlled by the rudder signal by increasing the speed of the counter-clockwise rotating motor drives while decreasing the speed of the clockwise rotating motor drives.

15. The helicopter according to claim 12, wherein the rear propulsion system differs from the secondary propulsion systems in power and thrust values.

16. The helicopter according to claim 12, wherein:
the main propulsion system includes at least one main motor drive and a main drive shaft that carries and propels a main differential contra-rotating transmission; and
each of the secondary propulsion systems includes at least one secondary motor drive and a secondary drive shaft that carries and propels respective secondary propulsion blades.

17. The helicopter according to claim 12, wherein:
the rear propulsion system is a secondary propulsion system that includes at least one secondary motor drive and a secondary drive shaft that carries and propels respective secondary propulsion blades.

18. An asymmetric multirotor helicopter, comprising:
a structure supporting a main propulsion system, two lateral secondary propulsion systems and a rear propulsion system each having a respective drive shaft;
a flight control unit that controls the helicopter by varying the relative speed of each of the main, lateral and rear propulsion systems to change the respective thrust and the torque produced by the main, lateral and rear propulsion systems;
said main propulsion system including at least one main motor drive and a main drive shaft that carries and propels a main differential contra-rotating transmission;
each of said secondary propulsion systems including at least one secondary motor drive and a secondary drive shaft that carries and propels respective secondary propulsion blades;
said main differential contra-rotating transmission sharing the power provided by the main drive shaft with two contra-rotating output shafts so as to transfer an increased output torque to the two contra-rotating output shafts without inducing a high reactive torque on said structure;

said two contra-rotating output shafts supporting and propelling for mutually contra-rotation motion two sets of main propulsion blades;

the main drive shaft rotating in the same direction as the drive shaft of the rear propulsion system;

the respective drive shafts of the two lateral secondary propulsion systems rotating in an opposite direction to the main drive shaft;

said main propulsion blades providing significantly higher thrust than the secondary propulsion blades;

said main drive shaft transferring a torque that varies in a range matching that of the secondary drive shafts;

the main propulsion system differs from the secondary and rear propulsion systems in power and thrust values and causes an asymmetric thrust distribution around a center of gravity of the helicopter; and the center of gravity of the helicopter is closer to the main propulsion system than to the rear propulsion system, whereby the multirotor helicopter has an asymmetric geometry.

19. The helicopter according to claim 18, wherein the motor drive of the rear propulsion system has a different power rating to the respective secondary motor drives of the two lateral secondary propulsion systems.

20. The helicopter according to claim 18, wherein the propulsion blades connected to the drive shaft of the rear propulsion system have a different diameter to the respective secondary propulsion blades of the two lateral secondary propulsion systems.

* * * * *